Nov. 25, 1930.  M. D. TUCKER ET AL  1,783,102
REENFORCED HOLDDOWN FOR LOADING AUTOMOBILES AND OTHER VEHICLES
Filed Nov. 23, 1928  2 Sheets-Sheet 1

INVENTOR.
Max D. Tucker.
BY Clifford L. Snyder.
ATTORNEY.

Nov. 25, 1930.   M. D. TUCKER ET AL   1,783,102
REENFORCED HOLDDOWN FOR LOADING AUTOMOBILES AND OTHER VEHICLES
Filed Nov. 23, 1928   2 Sheets-Sheet 2
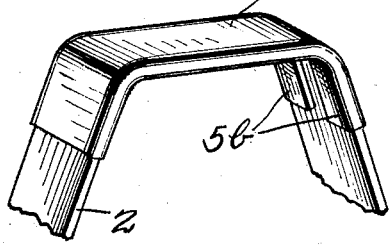
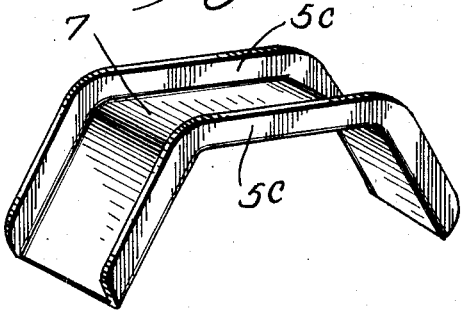
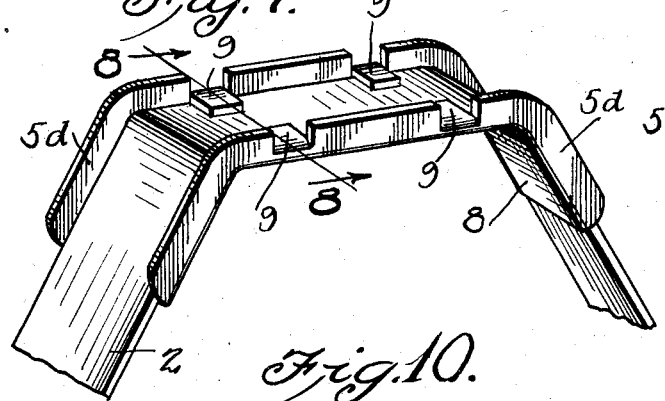
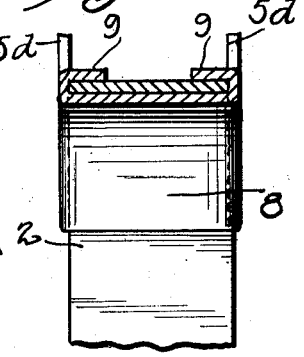
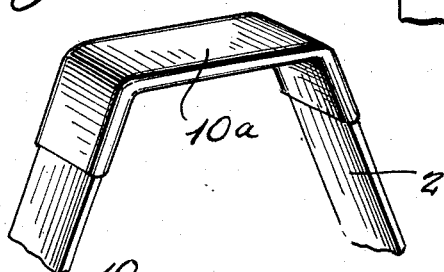
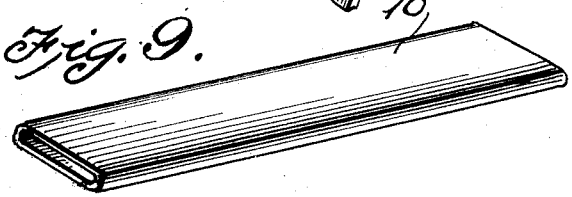
INVENTORS
Max D. Tucker
BY Clifford L. Snyder
ATTORNEY.

Patented Nov. 25, 1930

1,783,102

UNITED STATES PATENT OFFICE

MAX D. TUCKER AND CLIFFORD L. SNYDER, OF DETROIT, MICHIGAN, ASSIGNORS TO THE EVANS AUTO LOADING CO. INC., OF DETROIT, MICHIGAN

REENFORCED HOLD-DOWN FOR LOADING AUTOMOBILES AND OTHER VEHICLES

Application filed November 23, 1928. Serial No. 321,421.

This invention relates to certain new and useful improvements in reenforced holddowns for loading automobiles and other vehicles and has as its primary object, the provision of a reenforcing element for that part of the holddown that is engaged with a part of the automobile or vehicle.

In the shipment of automobiles, in which the holddowns employed are of the metallic strap type and also in analogous holddowns, it has been found that the holddowns quite frequently break due to chafing and movement of the automobile and holddown during transit and the object of this invention is therefore, to reenforce or brace that part of the holddown engaged with the automobile or other vehicle.

With the above and other objects in view that will become apparent as the nature of the invention is better understood, the same consists in the novel form, combination and arrangement of parts hereinafter more fully described, shown in the accompanying drawings and claimed.

In the accompanying drawings, wherein like reference characters indicate corresponding parts throughout the several views, Figure 1 is a fragmentary rear perspective view showing an automobile anchored during shipment by the improved holddown and illustrating the reenforcing element associated with the holddown;

Figure 5 is a fragmentary perspective view showing the reenforcing element reversely positioned upon the holddown strap with the side flanges disposed at the underside of the strap;

Figure 6 is a perspective view of another form of reenforcing element preformed and adapted to be associated with the holddown strap at the time of anchoring the automobile;

Figure 7 is a perspective view of another form of reenforcing element substantially U-shaped in cross-section and disposed at the underside of the holddown strap with lugs struck out from the side flanges of the reenforcing element and back inwardly to retain the same engaged with the holddown strap;

Figure 8 is a cross-sectional view taken on line 8—8 of Figure 7;

Figure 9 is a perspective view of another form of reenforcing element in the shape of a flat tube; and Figure 10 is a perspective view showing the reenforcing element disclosed in Figure 9, associated with a holddown strap.

Figure 1:
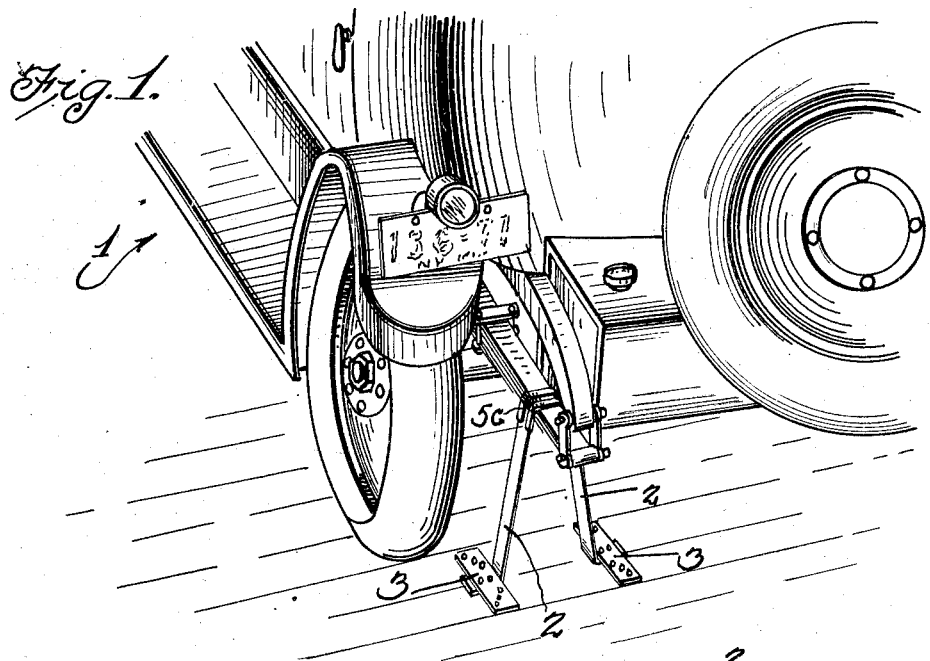
Figure 2:
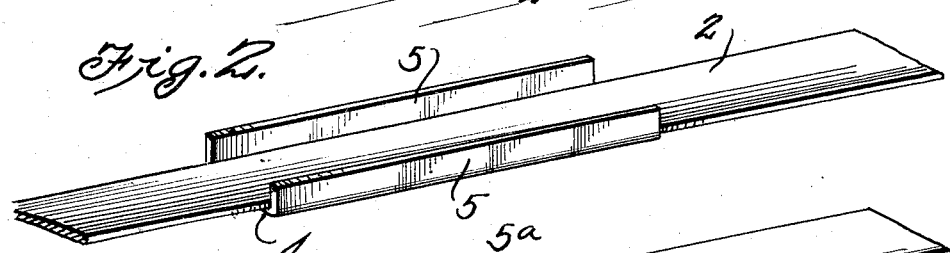
Figure 2 is a perspective view showing the initial assembly of the holddown jack and reenforcing element with the side flanges of the reenforcing element and base portion being of channel formation.

It has been found that during the shipment of automobiles, wherein a holddown strap is engaged with a part of the automobile, that said straps frequently become broken due to chafing and rubbing action resulting from relative movement between the automobile and holddown during transit and from other conditions incident to the shipment of motor vehicles and the primary object of this invention is to reenforce that part of the holddown engaged with an automobile. It is intended to reenforce the vehicle engaged part of the holddown strap by adding thereto a section of light gage metal or other material and in several forms of the invention, the reenforcing element forms a component part of the initial manufacture of the holddown so that the holddown and reenforcing element form a unitary structure, while in other forms, it is intended to manufacture the reenforcing elements separate from the holddown strap for association with the straps at the time of anchoring the automobile for shipment.

In the form of the invention shown in Figures 1 to 4, the holddown is illustrated as associated with an automobile 1, the holddown illustrated being of the strap type and designated by the reference numeral 2 having at its ends the usual anchoring feet 3.

Figure 3:
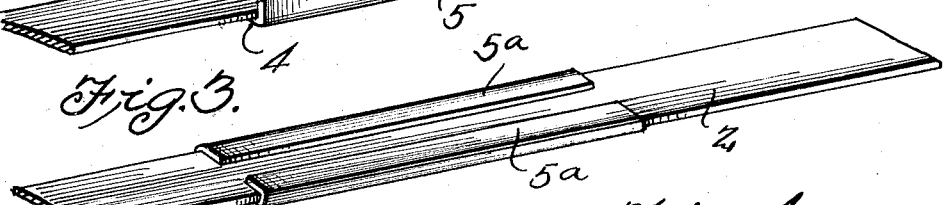
Figure 3 is a perspective view showing the side flanges of the reenforcing element moved inwardly and downwardly into engagement with the holddown strap.
Figure 4:
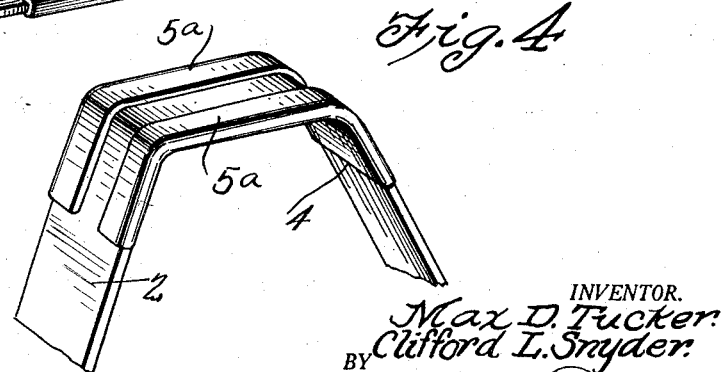
Figure 4 is a perspective view showing the assembled holddown strap and reenforcing element bent into holddown formation.

The holddown strap 2 is reenforced intermediate its ends and at that part engaged with the automobile as shown in Figure 1, the reenforcing element herein illustrated comprising a metallic strap 4 disposed at the lower side of the strap 2 and having side flanges 5 projecting perpendicularly therefrom. The side flanges 5 are bent inwardly and downwardly as at 5ª for permanently securing the reenforcing element to the holddown strap and when so assembled as shown in Figure 3, the strap and reenforcing element are bent and fashioned into holddown formation as shown in Figure 4. It will be noted that various materials such as burlap and the like have been added to holddowns to protect the engaged part of an automobile from damage, but in this instance, the application of the additional element to the holddown strap is solely for the purpose of reenforcement and to reduce breakage of the holddown. As stated above, holddowns of the general type disclosed in this application quite frequently break at the point of engagement with the motor vehicle, but with a reenforcement of the character disclosed herein, the holddown strap is greatly strengthened and overcomes such a difficulty. In this form of the invention, the reenforcing element is permanently associated with the holddown and is preferably mounted thereon at the time of the manufacture of the holddown.

In the form of the invention shown in Figure 5, the reenforcing element 6 is located at the upper side of the holddown strap 2 and the side flanges 5ᵇ are bent inwardly and upwardly into engagement with the lower side of the holddown for contacting the engaged part of the motor vehicle.

Another form of the invention is shown in Figure 6, this type of reenforcing element being of independent manufacture and adapted for association with a holddown strap at the time of anchoring the automobile for shipment. The reenforcing element 7 is stamped or otherwise formed into the construction illustrated and the side flanges 5ᶜ thereof remain perpendicularly disposed. This form of reenforcing element is manufactured for association with the usual type of strap holddown.

Still another form of holddown is illustrated in Figures 7 and 8, the reenforcing element 8 having perpendicular side flanges 5ᵈ with lugs 9 struck out from the side flanges intermediate the ends thereof to be moved inwardly and downwardly into engagement with the holddown strap 2. The reenforcing element 8 is disposed at the lower side of said strap and the retaining lugs overlie the strap as illustrated and said reenforcing element is intended for permanent attachment to the holddown strap.

A further exemplification of a reenforcing element for a holddown is shown in Figures 9 and 10 and in this form of the invention, the reenforcing element 10 is in the form of a slot tube to be moved onto a holddown strap that is subsequently bent into holddown formation as shown at 10ª in Figure 10.

While the reenforcing element was heretofore referred to as being formed of metal, it is understood that the same may be constructed of any material of a nature to add strength to the holddown and while several different forms of reenforcing elements are herein disclosed, it is to be understood that the basic idea of this invention is broadly to apply a reenforcing element of any character to a holddown for the purpose of reducing breakage thereof.

What we claim as new is:—

1. The combination with an automobile holddown comprising a strap, of a reenforcing element interlockingly engaged with the strap.

2. The combination with an automobile holddown comprising a strap, of a reenforcing element interlockingly engaged with the strap, and said interlocking engagements operating to prevent lateral movement of the element relative to the holddown.

3. The combination with an automobile holddown comprising a strap, of a reenforcing element flatly engaged with the strap and side flanges on the reenforcing element engaging the strap.

4. The combination with an automobile holddown comprising a strap, of a reenforcing element flatly engaged with the strap and side flanges on the reenforcing element bent into engagement with the opposite face of the holddown strap.

5. A holddown device for automobiles comprising a vehicle-engaging portion, leg members extending downwardly from said vehicle-engaging portion and terminating in feet extending at an angle to said leg members, and foot plates for attaching said feet to the floor of a shipping conveyance, said vehicle-engaging portion having an upturned portion at each side edge thereof.

6. A holddown device for automobiles comprising a vehicle-engaging portion, leg members extending downwardly from said vehicle-engaging portion and terminating in feet extending at an angle to said leg members, and foot plates for attaching said feet to the floor of a shipping conveyance, the side edges of said vehicle-engaging portion being bent transversely to the plane of said portion.

7. A holddown device for automobiles comprising a vehicle-engaging portion, leg members extending downwardly from said vehicle-engaging portion and terminating in feet extending at an angle to said leg members, and foot plates for attaching said feet to the floor of a shipping conveyance, said vehicle engaging portion being reenforced at its side edges.

In testimony whereof we affix our signatures.

MAX D. TUCKER.
CLIFFORD L. SNYDER.